May 20, 1930.  H. A. TUTTLE  1,759,472
REVERSING MECHANISM
Filed July 9, 1928   3 Sheets-Sheet 1

May 20, 1930.  H. A. TUTTLE  1,759,472

REVERSING MECHANISM

Filed July 9, 1928   3 Sheets-Sheet 3

Inventor,
Henry A. Tuttle
by T. Drummond
atty

Patented May 20, 1930

1,759,472

UNITED STATES PATENT OFFICE

HENRY A. TUTTLE, OF UPTON, MASSACHUSETTS; JENNIE L. TUTTLE EXECUTRIX OF SAID HENRY A. TUTTLE, DECEASED

REVERSING MECHANISM

Application filed July 9, 1928. Serial No. 291,333.

This invention relates to reversing mechanisms of the type having planetary gearing to secure reverse drive and clutch mechanism to secure forward drive.

One of the objects of the present invention is the provision of a reversing gearing of the above type which has short axial extent.

A gearing of the present type usually includes a pinion gear which is fixed to the hub of the engine gear. In order to provide for a reverse gearing of small axial extent, it is a further object of this invention to arrange the clutch mechanism at the forward end of the gearing and over and in driving engagement with the hub of the engine gear. The clutch mechanism thus occupies space which heretofore has not been utilized ordinarily for this purpose and which must of necessity be provided to secure sufficient driving engagement between the engine shaft and the engine gear.

The hub of the engine gear is usually keyed onto the driving or engine shaft and usually extends rearwardly beyond the end of said shaft. The hub is sometimes cramped to one side or the other when it is driven on the shaft so that the gear does not run true or concentric with the shaft. This lack of concentricity displaces the gear and so sets up undesirable noise in the gearing when the gearing is operated for reverse drive and also causes uneven wear and high stresses on the teeth of the gearing which result in the teeth becoming broken or rapidly worn. Consequently, it is an object of the present invention to provide the engine gear with a separate hub and to mount the engine gear rotatably on the propeller shaft and provide a flexible driving connection between the engine gear and the hub, which connection is so arranged that there can be a substantial amount of relative movement between the hub and the gear without displacing the gear from its intended relation with the associated elements of the reverse gearing and from its coaxial relation with the driven or propeller shaft. Such a construction also is highly advantageous since, while the engine or driving gear must be of high grade, and consequently, expensive steel, the hub can be of a much cheaper material and thus the cost of the gearing can be kept down.

A further object of the invention is the provision of a gearing construction wherein the rotary speed of the planetary pinion gears is relatively slow thereby to provide a gearing which is comparatively slow when operating for reverse drive.

A further object of the invention is a construction of reversing gear casing that can be removed by movement rearwardly of the propeller shaft and wherein the propeller or driven gear can be removed from the casing through an aperture provided by the removal of a casing plate.

A further object of the invention is to improve the operating mechanism for the brake and clutch mechanisms whereby to strengthen and simplify the parts.

Further objects of the invention will be pointed out hereinafter.

Fig. 5 is a rear elevation of the gearing.

Fig. 6 is a detailed elevation partly broken away of the engine gear hub.

Fig. 7 is a sectional elevation of the engine gear.

Fig. 9 is a perspective view of the operating yoke for the brake and clutch mechanisms.

Figure 1:
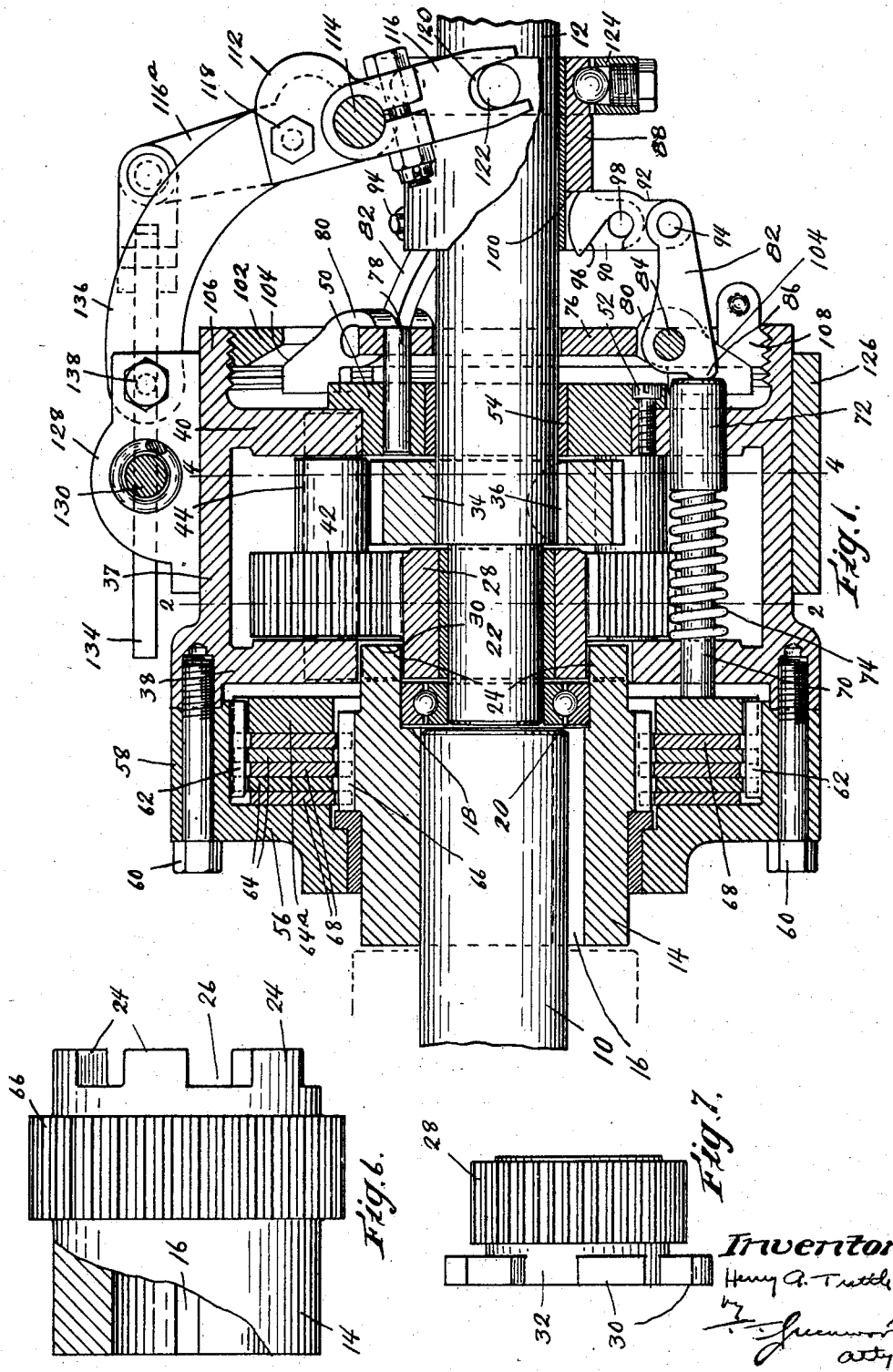
Fig. 1 is a sectional elevation through the reversing gearing embodying the invention taken along line 1—1 of Fig. 2.
Figure 2:
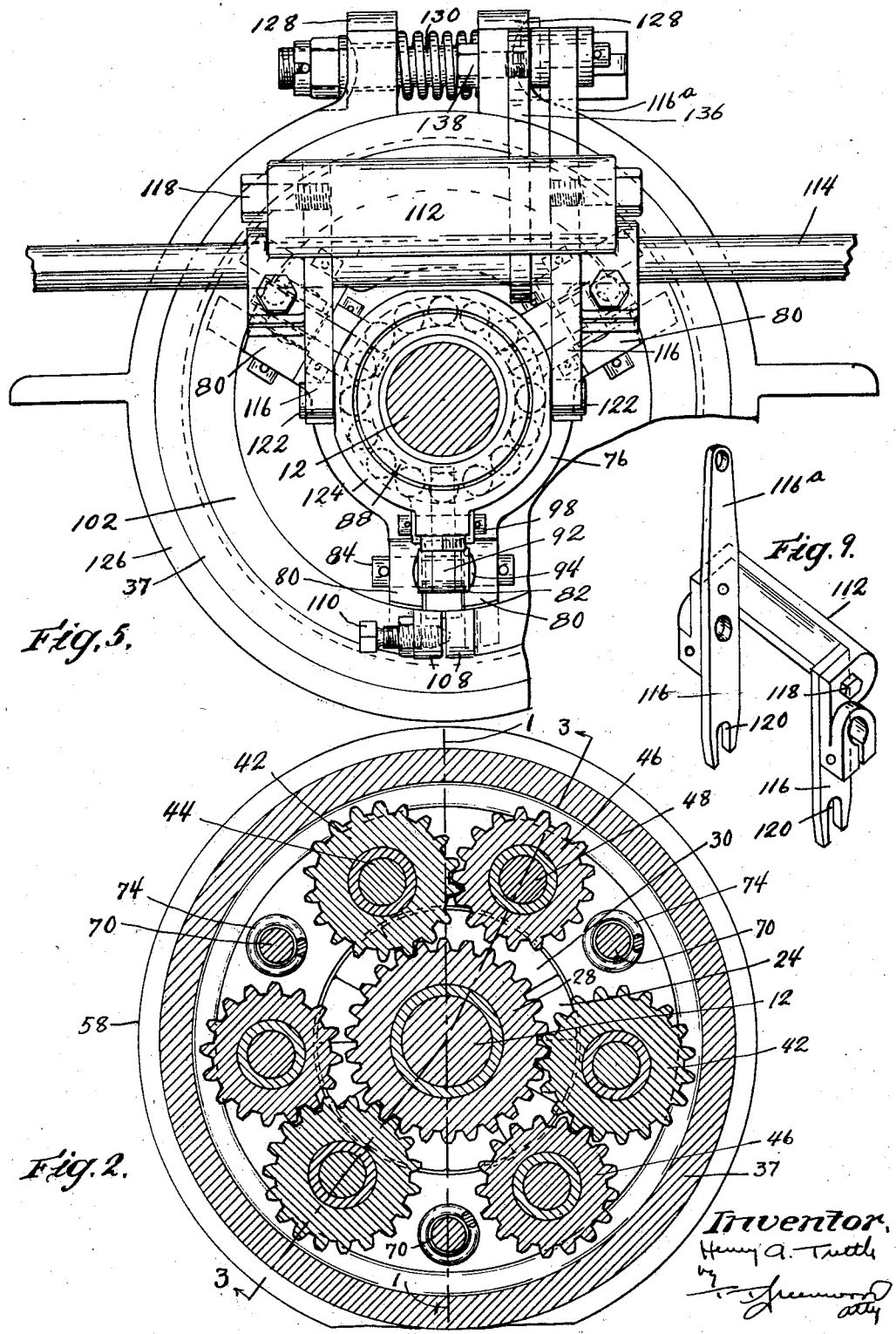
Fig. 2 is a section taken along line 2—2 of Fig. 1.
Figure 3:
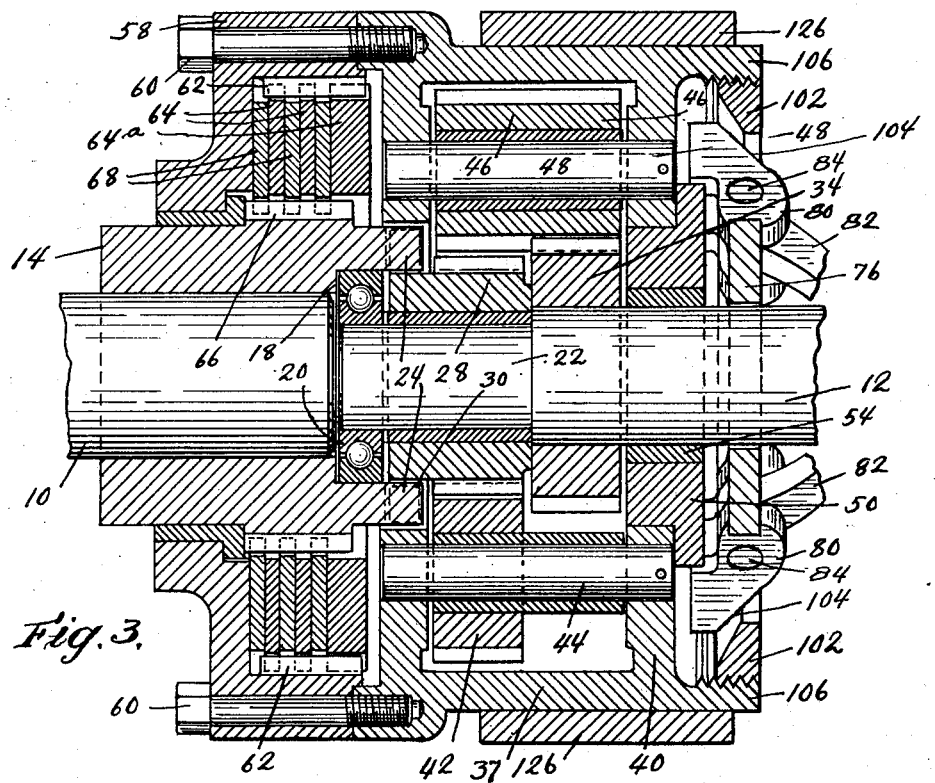
Fig. 3 is a section taken along line 3—3 of Fig. 2.
Figure 4:
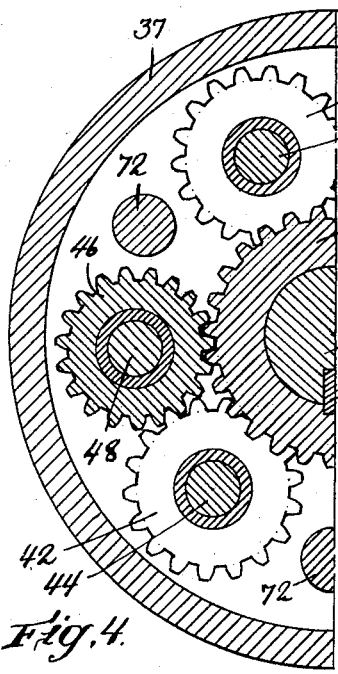
Fig. 4 is a section of one-half the gearing taken along line 4—4 of Fig. 1.

The reversing gearing embodying this invention includes the engine or driving shaft 10 and the propeller or driven shaft 12 which is axially aligned with the driving shaft. The engine shaft has an engine gear hub 14 fixed thereon and secured thereto by a key 16. Said hub is provided with an enlarged internal recess 18 in the bottom of which a ball bearing 20 is located; and the reduced end 22 of the driven shaft is received in said bearing.

The engine gear hub extends rearwardly beyond the engine shaft and the ball bearing and has a plurality of clutch teeth 24 and corresponding recesses 26 in its rear face. A spur engine gear 28 is journalled on the reduced forward end 22 of the propeller shaft immediately at the rear of the ball bearing 20 and has radially extended teeth 30 and corresponding indentations 32 which mesh with the indentations and teeth of the hub 14 whereby to connect the hub and the gear in positive driving engagement. The toothed driving connection between the hub and the gear is somewhat loose, so as to permit a substantial amount of relative movement between the two so that the hub can be concentric on the engine shaft without effecting the position of the engine gear. The engine gear is of high grade and therefore expensive steel, while the gear hub can be of cheaper steel since it is separate from the gear, thereby effecting economy in construction.

With this construction also the engine gear can be smaller in diameter than its hub whereby the diameter of the planetary pinion gears meshing with the spur gear can be increased, and the speed of rotation thereof reduced without increasing the radial extent of the gearing. This construction also provides a hub having a shaft hole clear through it and one that is free from constriction or internal shoulders, so that it can be easily and cheaply machined. The construction also is such that the bearing 20 for the propeller or driven shaft can be located forwardly of the engine gear thus to provide a better support for the shaft than is ordinarily the case.

A spur driven gear 34 of suitably larger diameter than the engine gear is fixed to the propeller shaft by suitable means, as the Woodruff key 36, immediately beside and at the rear of the engine gear.

The driving and driven gears are adapted to be connected for reverse drive through planetary pinion gears which are carried by a gear carrier comprising a casing or drum having a cylindrical wall 37 and axially spaced integral radially inwardly extended walls or flanges 38 and 40. Sets of large and small pinion gears are carried by the gear carrier and connect the driving and driven spur gears. Each set of pinion gears comprises a large pinion gear 42 which is in mesh with the driving spur gear 28 and is journalled on a pin 44 extended between and supported by the flanges 38 and 40 of the gear carrier. Said pinion gear is in mesh with a small and longer pinion gear 46 which is journalled on a pin 48, similar to the pin 44. Said pinion gear 46 is in mesh also with the driven spur gear 34. Thus when the gear carrier is held stationary said gears operate to drive the driven shaft 12 reversely of the driving shaft.

The wall or flange 40 of the gear carrier is provided with an axial opening therein which is at least as large in diameter as the driven gear 34 so that said gear can be removed from the position illustrated through said aperture. Said aperture is closed by a plate 50 which is detachably secured to the flange 40 by screws 52. Said plate has a bushing 54 therein which provides a rotatable support for the gear carrier on the driven shaft.

Clutch mechanism is provided to clutch the gear carrier for conjoint rotation with the driving shaft whereby to set the gearing for forward drive. Said clutch mechanism includes a plate 56 which overlies and has a rotatable bearing on the hub 14 of the engine gear. Said plate has an axially extended peripheral wall 58 that abuts against the forward wall 38 of the gear carrier and encloses between said forward wall and plate 56, a clutch plate compartment. Said plate 58 is fixed detachably to the gear carrier by means of bolts 60. The inner face of said cylindrical wall 58 is provided with internal axially extended projections as internal gear teeth 62 which are in mesh with external projections or gear teeth of one set of clutch plates 64. The rearmost clutch plate 64ª of said set is thicker than the others and forms a pressure plate against which pressure is supplied in an axial direction to set the clutch. The hub 14 is provided with axially extended projections as the spur gear teeth 66 on its outer periphery which engage internal gear teeth of a set of clutch plates 68 which are alternate with the clutch plates 64. The arrangement is such that when said clutch plates are pressed together the gear carrier is rotated conjointly with the driving shaft whereby to drive the driven shaft through the gears in the same direction and at the same speed as the driving shaft. The clutch plates are pressed together by means of pins 70 which are located between the sets of pinion gears and are axially movable in the end flanges 38 and 40 of the gear carrier. Movement of said pins forwardly causes the forward ends thereof to bear against the clutch or pressure plate 64ª and thereby set the clutch. The pins are provided with enlarged rear ends or heads 72 and compression springs 74 encircle said pins and bear at their rear ends against said heads and at their forward ends against the flange 38 whereby to urge said pins away from said clutch plates. Said springs are sufficiently strong to resist displacement due to centrifugal force acting on the clutch operating links, about to be described, which bear against the rear ends of said pins.

With this arrangement the clutch plates can be removed from the clutch compartment by the removal of the cover plate 56 from its connection with the casing 37 without disconnecting the rest of the gearing.

The clutch operating mechanism includes a link-supporting plate 76 which is located in the rear of the carrier plate 50 and has a loose driving connection therewith by means of a pin 78 which is fixed in said plate 50 and extends loosely through an aperture in said plate 78. Said plate 76 is provided with spaced ears 80 between which clutch operating links 82 are pivoted on pins 84. Said links are provided at their forward ends with toes 86 which are adapted to bear against the rear faces of the clutch operating pins 70 and urge them forward to set the clutch. The rear ends of the links 82 are moved outwardly to set the clutch by means including a sleeve 88 which is slidably supported freely on the propeller or driven shaft 12 and is adapted to be moved rearwardly to set the clutch for forward drive and forwardly to set the gearing for reverse drive. Said sleeve is provided with spaced outstanding ears 90 at the forward end thereof between which the inner ends of links 92 are located. Said links 92 are pivoted on pins 94 to the rear ends of the links 82. The inner ends of said links 92 have diagonal notches 96 therein through which pins 98 carried by the ears 90 are received. The formation of the notches 96 and the relation of the links and the sleeve are such that the links are constrained to stay on the pins 98 regardless of the position of the links. The rear faces of the links are adapted to engage abutments 100 of the sleeve 88 whereby to hold the clutch mechanism in clutch-set condition and prevent rearward movement of the sleeve 88 in a clutch setting direction beyond full clutch-set position.

The link-supporting plate 76 has a floating or self-seating connection with a clutch-pressure adjusting ring 102 by means of the engaging spherical faces 104 of said ring and the ears of said plate whereby the plate can shift its position so as automatically to have equal pressure applied to the clutch thrust pins 70. The ring 102 is internally screw threaded within a rearwardly extended cylindrical projection 106 of the gear carrier and can be rotated therein to move the link-supporting plate 76 forwardly and rearwardly whereby to vary the clutch engaging pressure and compensate for wear between the clutch plates and associated parts. Said ring 102 is split and the proximate ends 108 thereof are adapted to be spread apart by a screw 110 whereby to lock the clutch plate releasably in adjusted position.

The arrangement of the pressure adjusting ring and self-seating supporting plate is essentially as described and claimed in my copending application Serial No. 180,705 filed April 4, 1927.

The sleeve 88 is moved axially of the propeller shaft by means including a yoke 112 which is clamped to a cross shaft 114 located above the sleeve and extended transversely of the sleeve and propeller shaft. Said shaft is provided with the usual operating handle, not shown, by which the shaft can be rocked to operate the mechanism. The yoke is provided with bars 116 at its ends which are fixed detachably to the yoke by bolts 118 and have openings therein through which the shaft 114 is passed. The lower ends of said bars have slots 120 therein which loosely engage pins 122 of a thrust collar 124 which is rotatably secured to the sleeve 88. This construction of the yoke in the bars 116 permits the yoke to be made of cast iron so that it can be readily made in a variety of shapes frequently necessary to clear various parts of the gearing and which also permits the bars 116 to be made of stronger material as steel for strength. One of the bars 116 has an integral upper extension 116$^a$ for operating the brake mechanism which is adapted to set the gearing for reverse drive.

Figure 8:
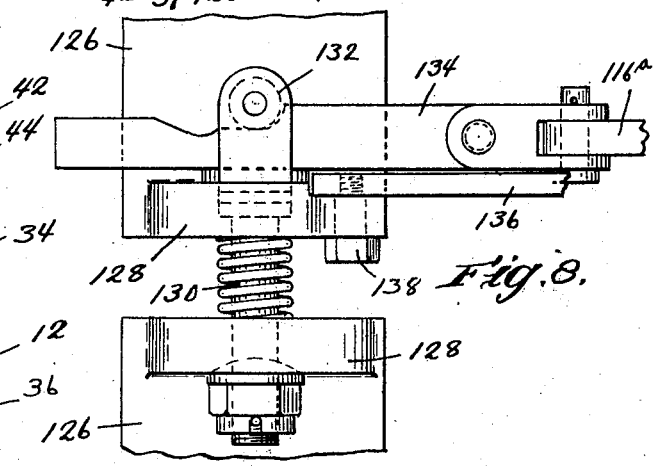
Fig. 8 is a plan detail of the brake band and its supporting and operating mechanism.

Said brake mechanism includes a flexible brake band 126 which surrounds the cylindrical drum 37 of the gear carrier and is adapted frictionally to engage said carrier and hold it stationary for reverse drive. The brake band is provided with upstanding spaced ends 128, especially see Fig. 8, and through which a bolt 130 is passed loosely. Said bolt carries a cam roller 132 at an outer end thereof which is engaged by a cam face of a bar 134 connected with the extension 116$^a$ of one of the yoke bars whereby, when said cam bar 134 is moved rearwardly, to draw the ends of the brake band together about the gear carrier or drum. Heretofore, it has been customary to locate the brake band within a groove in the drum whereby to hold it against axial displacement when the brake is operated to set the gearing for reverse drive. This arrangement is expensive and for other reasons is sometimes undesirable. In accordance with this invention, the brake band is held against axial movement due to the action of the cam bar 134 by means of a radius bar 136 which is pivoted at its forward end on a screw threaded pin 138 carried by one of the ends of the brake band. The rear end of said bar is supported loosely on the cross shaft 114. Said radius bar is located immediately adjacent the cam bar 134 and thus is close to the point of application of an axially directed displacing force acting on the brake band whereby it can hold the brake band against such force without setting up cramping strains on the band or without permitting the band to twist.

I claim:

1. Reversing mechanism including the combination of driving and driven shafts, gearing to secure reverse drive including a gear carried by said driven shaft, a hub carried by said driving shaft, a flexible positive driving connection between said hub and gear which permits both to rotate freely in angular displacements thereof, a gear fixed to the driven shaft, planetary pinion gears meshing with the aforesaid gears, an axially fixed carrier for said pinion gears, and means to hold said carrier stationary for reverse drive.

2. Reversing mechanism including the combination of aligned driving and driven shafts, clutch mechanism to secure forward drive and gearing to secure reverse drive including planetary pinion gears, a spur gear carried by said driven shaft meshing with said pinion gears, a hub carried by said driving shaft, a flexible positive driving connection between said hub and driving gear which permits both to rotate freely about independent angularly-displaced axes, a gear fixed to the driven shaft, planetary pinion gears meshing with the aforesaid gears, an axially stationary planetary gear carrier, means to hold the carrier stationary for reverse drive, said clutch mechanism including clutch plates carried by said carrier and said hub, and means pressing said plates together against said carrier to set the clutch mechanism for forward drive.

3. Reversing mechanism including a combination of driving and driven shafts, gearing to secure reverse drive including a gear carried by said driven shaft having radially outstanding clutch teeth, and a hub carried by said driving shaft having axially extended clutch teeth which mesh loosely with the teeth of said gear and provide a flexible driving connection between said hub and gear which permits said gear to assume various angular positions with respect to said hub, a gear fixed to the driven shaft, planetary pinion gears meshing with the aforesaid gears, an axially-stationary carrier for said pinion gears, and a brake drum surrounding said carrier and engageable therewith to hold it stationary for reverse drive.

4. Reversing mechanism having the combination of aligned driving and driven shafts, an axially immovable driving spur gear journalled on said driven shaft and having a flexible driving connection with said driving shaft by which it can be rotated by said hub when axially displaced angularly with respect thereto, a driven gear fixed to said driven shaft, planetary pinion gears connecting said driving and driven gears, a carrier for said planetary pinion gears having a rotatable support on both shafts and surrounding said flexible driving connection, and means to hold said carrier stationary for reverse drive.

5. Reversing mechanism including the combination of aligned driving and driven shafts, clutch mechanism to connect said shafts for forward drive, and gearing mechanism to connect said shafts for reverse drive including a driving gear hub fixed to said driving shaft, and having a bearing recess therein located in the rear of said driving shaft, a bearing therein in which said driven shaft is located, a driving gear surrounding said driven shaft in the rear of said bearing and having a driving connection with said hub, a driven gear fixed to said driven shaft, planetary gearing elements meshing with both of said gears, an axially-stationary carrier for said gearing elements, means to hold said carrier stationary for reverse drive, and means including clutch plates connecting said carrier and hub for forward drive.

6. Reversing mechanism including the combination of aligned driving and driven shafts, clutch mechanism to connect said shafts for forward drive, and gearing mechanism to connect said shafts for reverse drive including a driving gear hub fixed to said driving shaft and having a bearing recess therein located in the rear of said driving shaft, a bearing therein in which said driven shaft is located, a driving gear journalled on said driven shaft in the rear of said bearing and having a flexible positive driving connection with said hub, a driven gear fixed to said driven shaft, planetary gearing elements meshing with both of said gears, an axially stationary carrier for said gearing elements, means to hold said carrier stationary for reverse drive, and means including clutch plates connecting said hub and carrier for forward drive.

7. In a reversing mechanism, the combination of aligned driving and driven shafts, a driving gear overlying the driven shaft and having a driving connection with the driving shaft, a bearing for the driven shaft located forwardly of said gear, a driven gear fixed to said driven shaft, planetary gearing elements meshing with both of said gears, an axially-stationary carrier for said gearing elements, means to hold said carrier stationary for reverse drive, and means including clutch plates connecting said hub and driving shaft for forward drive.

8. In a reversing mechanism, the combination of aligned driving and driven shafts, a driving gear hub fixed to said driving shaft, a driving gear overlying said driven shaft and having a driving connection with said hub, a bearing in said hub forwardly of said driving gear in which said driven shaft is located, a driven gear fixed to said driven shaft, planetary gearing elements meshing with both of said gears, an axially stationary carrier for said gearing elements, means to hold said carrier stationary for reverse drive, and means including clutch plates connecting said hub and carrier for forward drive.

9. Reversing mechanism incluing the combination of driving and driven shafts, clutch mechanism to secure forward drive, and reversing gearing to secure reverse drive including planetary pinion gears, a driving spur gear in mesh with said pinion gears, a hub which is larger in diameter than said spur gear having a positive flexible driving connection therewith and carried by said driving shaft, a spur gear fixed to said driven shaft meshing with said pinion gears, an axially-stationary pinion gear carrier overlying both of said shafts and having a rotatable support on said hub, means to hold said carrier stationary for reverse drive, clutch plates located within said carrier and connected respectively therewith and with said hub, and means to move said clutch plates axially to set the mechanism for forward drive.

10. Reversing mechanism comprising the combination of aligned driving and driven shafts, clutch mechanism connecting said shafts for forward drive and gearing mechanism connecting said shafts for reverse drive including a hub fixed to said driving shaft, a spur driving gear journalled on said driven shaft and having a flexible positive driving connection with said hub by which it can be rotated in an angularly displaced position with respect to said hub, a spur gear fixed to said driven shaft beside said driving gear, a rotatable axially fixed gear carrier surrounding said spur gears, intermeshing planetary pinion gears connecting said spur gears and having a rotatable support on said carrier, and brake mechanism to hold said carrier stationary to set the gearing for reverse drive.

11. Reversing mechanism including the combination of aligned driving and driven shafts, planetary gearing connecting said shafts for reverse drive including a hub fixed to said driving shaft, a driving gear that is separate from and has a driving connection with said hub, planetary gearing elements connecting said gear and said driven shaft including planetary pinion gears driven by said driving gear, a rotatable axially fixed carrier for said pinion gears, means to hold said carrier stationary for reverse drive, and clutch mechanism connecting said shafts for forward drive located in front of said carrier and around said hub and having clutch-elements which are carried by and have a driving connection one with said carrier and another with said hub.

12. Reversing mechanism including the combination of aligned driving and driven shafts, planetary gearing connecting said shafts for reverse drive including a hub fixed to said driving shaft, a driving gear having a driving connection with said hub, planetary gearing elements connecting said gear and said driven shaft including planetary pinion gears driven by said driving gear, a gear fixed to said driven shaft meshing with said pinion gears, a rotatable axially fixed carrier for said pinion gears, means to hold said carrier stationary for reverse drive, and clutch mechanism connecting said shafts for forward drive located in front of said carrier and around said hub and having clutch-elements which have a driving connection one with said carrier and another with said hub, clutch operating mechanism located at the rear of said carrier, and clutch operating elements extended forwardly through said carrier into operative engagement with said clutch-elements.

13. Reversing mechanism comprising the combination of driving and driven shafts, planetary gearing connecting said shafts for reverse drive including a driving gear having a hub fixed to said driving shaft, means including planetary pinion gears connecting said driving gear and driven shaft, a rotatable casing comprising a carrier for said pinion gears surrounding said driving gear, and having a compartment which surrounds said hub, clutch plates located in said compartment around said hub and having driving connections separately with said carrier and with said hub, and operating mechanism to set the clutch mechanism.

14. Reversing mechanism including the combination of driving and driven shafts, gearing connecting said shafts for reverse drive including a driving gear having a hub fixed to said driving shaft, planetary pinion gears for connecting said driving gear with said driven shaft, a rotatable axially fixed carrier for said pinion gears having a rear wall which has a rotatable support on said driven shaft and a front wall which has a rotatable support on said hub, cooperating clutch elements disposed at the rear of said front wall and having driving connections separately with said carrier and with said hub, and operating mechanism including thrust members carried by said carrier and extended between said pinion gears to set the clutch for forward drive.

15. Reversing mechanism including the combination of driving and driven shafts, gearing connecting said shafts for reverse drive including a driving gear journalled on said driven shaft, a driving hub fixed to said driving shaft and having a flexible positive driving connection at its rear end with said driving gear, means including planetary pinion gears and a gear fixed to said driven shaft for connecting said driving gear with said driven shaft, a carrier for said pinion gears rotatable about said hub, means to hold said carrier stationary for reverse drive, clutch mechanism connecting said shafts for forward drive including cooperating clutch elements surrounding said hub in front of said driving gear and said flexible driving connection therefor and having driving connections separately with said carrier and with said hub forwardly of said flexible driving connection, and operating mechanism to set the clutch mechanism for forward drive.

16. Reversing mechanism comprising the combination of driving and driven shafts, gearing mechanism connecting said shafts for reverse drive including a driving gear having a hub fixed to said driving shaft, means including planetary pinion gears connecting said driving gear with said driven shaft, a cylindrical casing surrounding said shafts and constituting a carrier for said pinion gears, clutch mechanism connecting said shafts through said gearing mechanism for forward drive including a plate surrounding said hub and spaced forwardly of said carrier and having an outer cylindrical wall rigid therewith, clutch plates located between said plate and carrier and having driving connections separately with said wall and with said hub, and operating mechanism to set the clutch mechanism for forward drive.

17. In a reversing mechanism of the type having clutch mechanism to secure forward drive and planetary gearing to secure reverse drive, the combination of a driving gear for the planetary gearing having an internal bearing and a driving hub aligned axially and having a flexible positive driving connection at one end with said gear by which both can rotate conjointly in angularly displaced positions, said hub also having peripherally disposed clutch plate driving members.

18. Reversing mechanism including the combination of driving and driven shafts, planetary gearing elements connecting said shafts for reverse drive including a gear-enclosing casing surrounding said shafts, clutch mechanism connecting said shafts for forward drive including cooperating clutch plates located forward of said casing, clutch operating mechanism located at the rear of said casing, clutch operating members carried by and movable axially of said casing between said gearing elements arranged to apply force on said clutch plates, and springs disposed between said gearing elements acting on said members to hold them yieldably out of operative relation with said clutch plates.

19. Reversing mechanism comprising the combination of driving and driven shafts, planetary gearing elements connecting said shafts for reverse drive including a gear-enclosing casing surrounding said shafts, clutch mechanism connecting said shafts for forward drive including cooperating clutch plates located forward of said casing, clutch operating mechanism located at the rear of said casing, clutch operating pins slidable within said casing between said planetary gearing elements and movable axially of said casing into pressure applying relation with said clutch plates, and springs encircling said pins within said casing and acting on said pins in a direction to hold them yieldably out of pressure applying relation with said clutch plates.

20. Reversing mechanism comprising the combination of aligned driving and driven shafts, planetary gearing elements connecting said shafts for reverse drive including a spur gear fixed to said driven shaft, means including planetary pinion gears connecting said spur gear with said driving shaft, a carrier for said pinion gears surrounding said driven shaft and having a rear radial wall which has an opening which is opposed to and is larger than said spur gear, and a plate over said opening having a detachable connection with said wall.

21. Reversing mechanism comprising the combination of aligned driving and driven shafts, planetary gearing elements connecting said shafts for reverse drive including a spur gear fixed to said driven shaft, means including planetary pinion gears connecting said spur gear with said driving shaft, a carrier for said pinion gears surrounding said driven shaft and having a rear radial wall which has an opening which is opposed to and is larger than said spur gear, and a plate over said opening having a detachable connection with said wall, said plate being supported rotatably by said driven shaft.

In testimony whereof, I have signed my name to this specification.

HENRY A. TUTTLE.